US005673082A

United States Patent [19]
Wells et al.

[11] Patent Number: 5,673,082
[45] Date of Patent: Sep. 30, 1997

[54] LIGHT-DIRECTED RANGING SYSTEM IMPLEMENTING SINGLE CAMERA SYSTEM FOR TELEROBOTICS APPLICATIONS

[75] Inventors: Dennis L. Wells, Friendswood; Larry C. Li, Sugarland; Brian J. Cox, Seabrook, all of Tex.

[73] Assignee: The United States of America as represented by the Administrator of the National Aeronautics and Space Administration, Washington, D.C.

[21] Appl. No.: 425,003

[22] Filed: Apr. 10, 1995

[51] Int. Cl.$^6$ ...................................................... H04N 7/18
[52] U.S. Cl. ............................................. 348/139; 382/106
[58] Field of Search ........................................ 348/113, 114, 348/115, 118, 119, 158, 148, 135, 139, 142, 116, 348, 123, 136; 33/284, 227, 277, 280; 356/306, 307; 354/403; 382/103, 106, 153; 250/559.23; 345/8

[56] References Cited

U.S. PATENT DOCUMENTS

| | | | |
|---|---|---|---|
| 4,969,735 | 11/1990 | Gilligan | 356/4 |
| 4,979,815 | 12/1990 | Tsikos | 356/1 |
| 5,008,695 | 4/1991 | Nagaoka et al. | 354/403 |
| 5,040,116 | 8/1991 | Evans, Jr. et al. | 364/424.02 |
| 5,109,345 | 4/1992 | Dabney et al. | 364/459 |
| 5,109,425 | 4/1992 | Lawton | 382/1 |
| 5,168,141 | 12/1992 | Tashjian et al. | 219/121.63 |
| 5,175,616 | 12/1992 | Milgram | 358/88 |
| 5,216,476 | 6/1993 | Lanckton | 356/2 |
| 5,320,538 | 6/1994 | Baum | 348/123 |
| 5,331,413 | 7/1994 | Diner | 348/114 |
| 5,510,625 | 4/1996 | Pryor et al. | 250/559.23 |

*Primary Examiner*—Amelia Au
*Attorney, Agent, or Firm*—James M. Cate

[57] ABSTRACT

A laser-directed ranging system has utility for use in various fields, such as telerobotics applications and other applications involving physically handicapped individuals. The ranging system includes a single video camera and a directional light source such as a laser mounted on a camera platform, and a remotely positioned operator. In one embodiment, the position of the camera platform is controlled by three servo motors to orient the roll axis, pitch axis and yaw axis of the video cameras, based upon an operator input such as head motion. The laser is offset vertically and horizontally from the camera, and the laser/camera platform is directed by the user to point the laser and the camera toward a target device. The image produced by the video camera is processed to eliminate all background images except for the spot created by the laser. This processing is performed by creating a digital image of the target prior to illumination by the laser, and then eliminating common pixels from the subsequent digital image which includes the laser spot. A reference point is defined at a point in the video frame, which may be located outside of the image area of the camera. The disparity between the digital image of the laser spot and the reference point is calculated for use in a ranging analysis to determine range to the target.

41 Claims, 8 Drawing Sheets

FRAME SUBTRACTION

FRAME A

FRAME B

FRAME C = FRAME B - FRAME A

LIGHT-DIRECTED RANGING SYSTEM IMPLEMENTING SINGLE CAMERA SYSTEM FOR TELEROBOTICS APPLICATIONS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The present invention relates generally to systems for determining the range of an object from a reference point, and more particularly to ranging systems useful in robotic applications. Still more particularly, the present invention relates to laser-directed ranging systems useful in telerobotics applications.

Ranging techniques generally are classified into one of two major categories—either active or passive. Active ranging techniques are those that actively engage the target by introducing an effect not already a part of the local environment, as for example, by electromagnetic radiation, sonic waves, or a laser beam. One common active ranging technique is based on "time-of-flight" detection, in which the transmission time of a radiated energy signal (electromagnetic, sonic, or ultrasonic radiation) to and from the target is measured and the range calculated therefrom.

A second common active ranging technique relies on phase-shift detection in a reflected signal. Sometimes called the Moire method, one amplitude-modulated spatial signal (e.g., reflected light from a scene) is multiplied by another amplitude-modulated spatial signal (e.g., a viewing grating) to create an output signal with surface depth information encoded as a phase difference.

In holographic interferometry, a third active ranging technique, coherent light from two separate laser beams, focused at a common surface point, is added and the surface depth is encoded in the detected phase difference.

Triangulation ranging techniques actively measure two interior angles, angle AB and angle BC, and the baseline B of a triangle ABC and then determine the length A or C from the viewing apparatus to the target surface. Basically, either the ambient light reflected from the target surface may be viewed from two angles, on opposite ends of the baseline, or light may be projected onto the target surface from one end of the baseline and viewed or detected from the opposite end of the baseline.

Passive ranging techniques measure the distance between a target and a fixed reference point on the basis of information derived from the target without illuminating or irradiating the target. Stadimetry, for example, determines the distance to a target from the known height of a target feature and the size of that feature within the image (i.e., the angle subtended by that target feature in the viewed image). This technique requires that the size of the target feature be known in order to calculate the target range.

Another passive ranging technique is that employed by the traditional parallax range finder. In this technique, the target is viewed from two optical apertures. When the lines of sight of the two apertures are parallel, two images are observed. By varying the angle of one viewing aperture, coincidence of the images is effected and angular variation of the one viewing aperture is a measure of target range.

Stereometric ranging is yet another passive ranging technique utilizing a stereoscopic image pair to deduce the three-dimensional characteristics of a target. In stereoscopic imaging, a pair of cameras are arranged as shown in FIG. 1, with the line-of-sight of the two cameras parallel, lying in the horizontal plane, and separated by distance, b. The normal range, $r_z$, from the front of the left camera lens to the vertical plane defined by a point, p, is calculated as follows:

$$r_z = \frac{fb}{x_l - x_r} + f \quad (1)$$

where f is the focal length of the two cameras, and $x_l$ (where l means "left") and $x_r$ (where r means "right") are the horizontal coordinates of the image of point, p, in the left and right camera images, respectively. The difference between the horizontal coordinates (i.e., $x_l - x_r$) is sometimes referred to as the "disparity."

Telerobotics is a collection of technologies that enable a human operator to control a robot at a remote site. A suitable ranging technique is an essential element of telerobotics applications to enable the remote operator to direct a robot manipulator to a particular position to effect a particular operation relative to a target. Many of the conventional ranging techniques are not suitable for telerobotics applications. Relatively inexpensive radar or sonar ranging instruments are incapable of reliably and consistently discriminating range in environments that include a number of objects having differing size and specular reflection characteristics. More accurate time-of-flight instruments are expensive. Laser and other phase change detectors also are quite expensive and are bulky and consume large amounts of power.

As for passive ranging techniques, stadimetry, requiring advance knowledge of the height of a target, is not suitable for real-time telerobotics applications that involve no prior target knowledge. Accordingly, most telerobotics applications utilize some form of parallax or stereometric ranging. These techniques, however, require for their success a high-contrast environment for enhanced accuracy and significant computational power, because the entire field of view of the camera images must be processed to identify the target within the image and to compute either the point of coincidence (for parallax ranging) or the disparity (for stereometric ranging). The computations typically involve large numbers of convolution and cross-correlation algorithms and result in a majority of time being spent processing unwanted range information. Because of the complex algorithms, these techniques are not suitable for real-time applications without using expensive, high-speed computers.

Hence, it would be advantageous to develop a ranging technique suitable for use in real time telerobotic applications that does not require the processing of complex algorithms and thus does not require the use of expensive, high-speed computers.

SUMMARY OF THE INVENTION

Accordingly, there is provided herein a light-beam directed ranging system adapted for telerobotics applications, in which a frame grabbing system connected to a video camera, and a processor operating in accordance with a disparity measurement algorithm, are operable for determining the range to a target which is illuminated by a light beam in fixed alignment with the camera.

The system of the present invention includes a single video camera for generating video images of the target device. The frame grabber first captures a video image of the target device and then captures a second video image of the target device which has been partly illuminated with the light beam, which typically comprises a laser. These two video images, taken sufficiently close enough together in time to minimize camera and scene motion, are converted to digital images, and then compared. All common pixels are eliminated, leaving only a digital image of the laser illumination. The center of the laser illumination then is obtained and compared with a predetermined reference point, to determine the disparity between the laser illumination point and the reference point. The reference point is predetermined by design or calibration and represents the coordinate at the focal plane of the laser illumination at infinite range. This disparity determination then is used to calculate range.

The laser and camera preferably are mounted on a platform, which can be oriented in all three dimensions to isolate on the particular target desired. The platform preferably is responsive to head movement of the operator, to simulate real-life conditions. Position and orientations sensors are used to monitor head movement of the operator. The camera and laser preferably are in an alignment such that the laser beam passes into the field of view.

BRIEF DESCRIPTION OF THE DRAWINGS

For a more detailed description of the preferred embodiment of the invention, reference will now be made to the accompanying drawings, wherein.

DESCRIPTION OF THE EXEMPLARY EMBODIMENT

Of the many different active and passive ranging techniques currently available, none are particularly well suited to real time telerobotic applications. Inexpensive active ranging systems, such as radar and sonar systems, are not sufficiently discriminatory and accurate for telerobotic applications. More accurate "time-of-flight" and phase change type active ranging systems are expensive and typically too bulky for telerobotic applications. Passive techniques such as stereometric ranging require high contrast environments and significant computational power to operate on a real-time basis. The present invention solves these problems by providing an improved ranging system in which a low-power laser is used to superimpose a high contrast image on the target and thereby to enable the elimination of unnecessary processing of background images surrounding the illuminated spot on the target.

Figure 1:
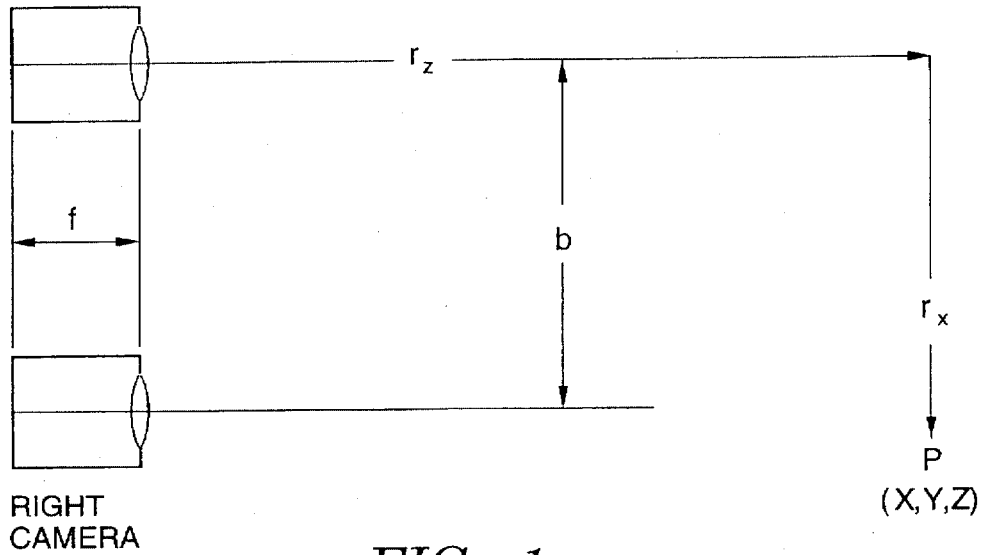
FIG. 1 is a diagram that demonstrates a technique of stereometric ranging using two cameras.
Figure 2:
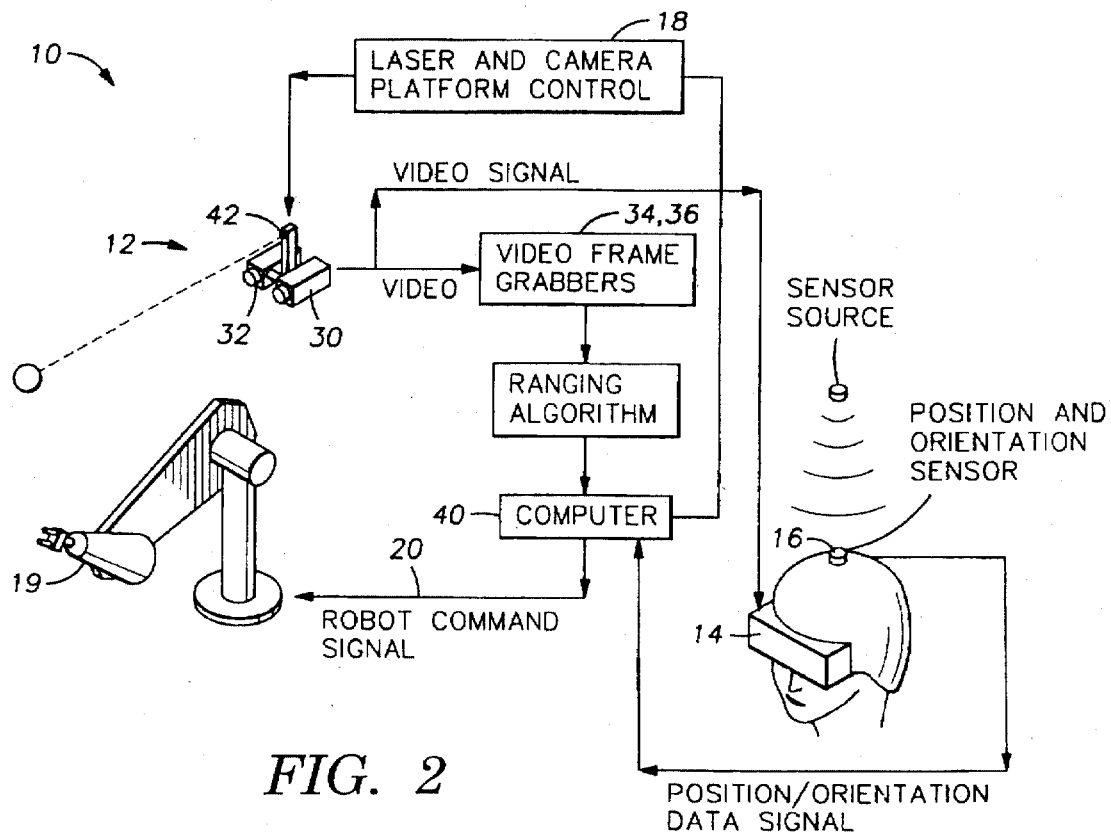
FIG. 2 is a functional block diagram depicting a single-camera laser-directed ranging system constructed in accordance with the principles of the present invention.

Referring now to FIG. 2, a light-beam directed ranging system 10 constructed in accordance with the principles of the present invention includes a single camera imaging and ranging system 12, a head-mounted display system 14, a position and orientation sensor system 16, a laser/camera platform control system 18, and a robot control system 20. One skilled in the art will understand, however, that similar systems may be constructed using the principles described herein for other robotic applications. For example, the control input signals may be obtained from a positioning system other than a head-mounted display. Similarly, the robotic device may comprise something other than a robotic arm (as shown in the preferred embodiment of FIG. 2).

A. General Apparatus and Method of Operation

Referring still to FIG. 2, the ranging system 10 is designed in accordance with the preferred embodiment to permit an operator to control a robot 19 at a remote location with head motions and voice commands. The single camera imaging and ranging system 12, which is located remote to the operator, captures visual images of the remote location. The visual images are conveyed electronically to the operator and provide real time feedback to the operator's head-mounted display system 14, thereby permitting the operator to observe and direct the robot.

A laser or other directional light source 13 preferably is mounted so that its directional beam passes into the camera's field of view and is offset by a known distance from the camera lens in the single camera imaging and ranging system 12. The laser enables the operator to illuminate a target. The video images, both laser-illuminated and not, are captured from the camera in a conventional frame grabber and are used in a computer-based ranging algorithm to identify the position of a target relative to the position of the robot. In the preferred embodiment, the laser 13 is offset both vertically and horizontally from the video camera lens centerline. The laser 13 preferably is oriented so that the light beam traverses the camera's field of view at a particularly desirable range of distances. Thus, if the desired range was 6 to 10 feet and the laser 13 was offset to the upper right of the camera, the directional light beam could enter the camera's field of view at the upper right corner at 6 feet, and could exit the field of view at the lower left corner at 10 feet.

The position and orientation sensor system 16 preferably connects to the operator's helmet and monitors the position and orientation of the operator's head. This position and orientation data is delivered to the laser/camera platform control system 18, which adjusts the position and orientation of the laser and camera in conformance with the operator's head movements.

Figure 7:
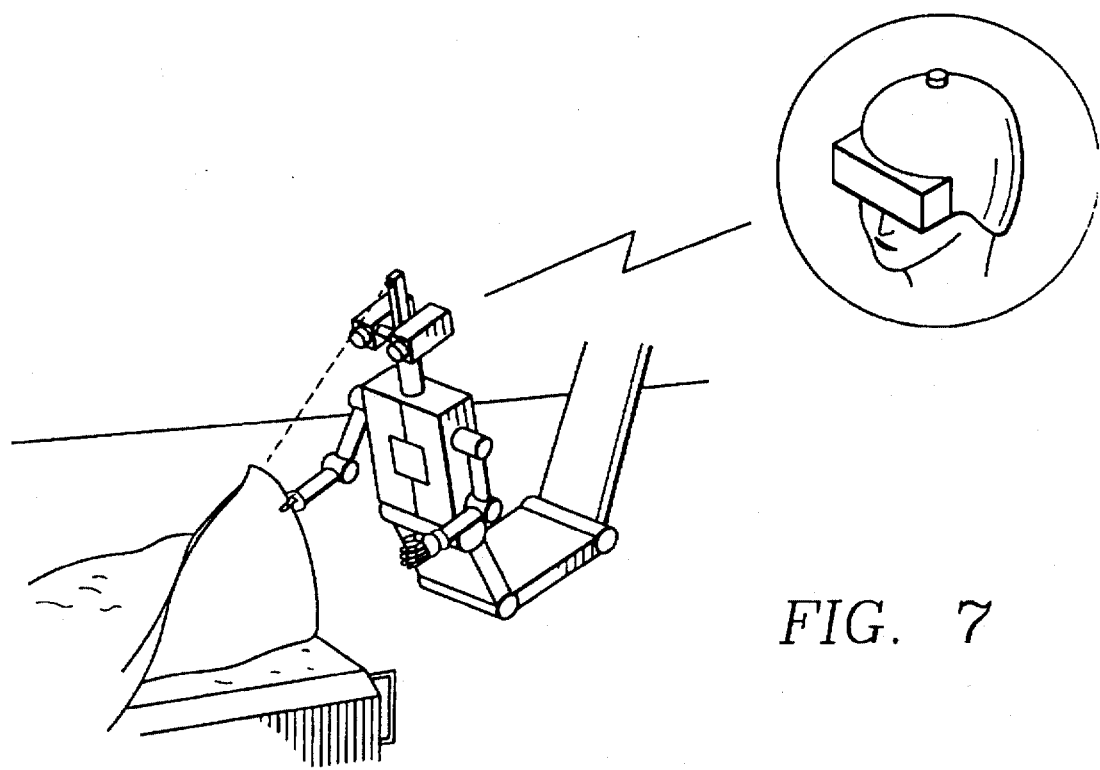
FIG. 7 is a perspective drawing illustrating a robotic application for the ranging system of the present invention.

In the operation of the exemplary embodiment, the operator turns on the laser 13 by voice command and points the laser at the target 21 by appropriate head movements. When the laser is properly targeted, the operator commands the system to identify the range to the target and commands the robot to engage the target as desired. An example of a suitable application for the present system is shown, for example, in FIG. 7. In the sections that follow, the components preferably comprising the ranging system 10 are identified and their interrelationship and operation are explained in detail.

B. Single Camera Imaging and Ranging System

Figure 3:
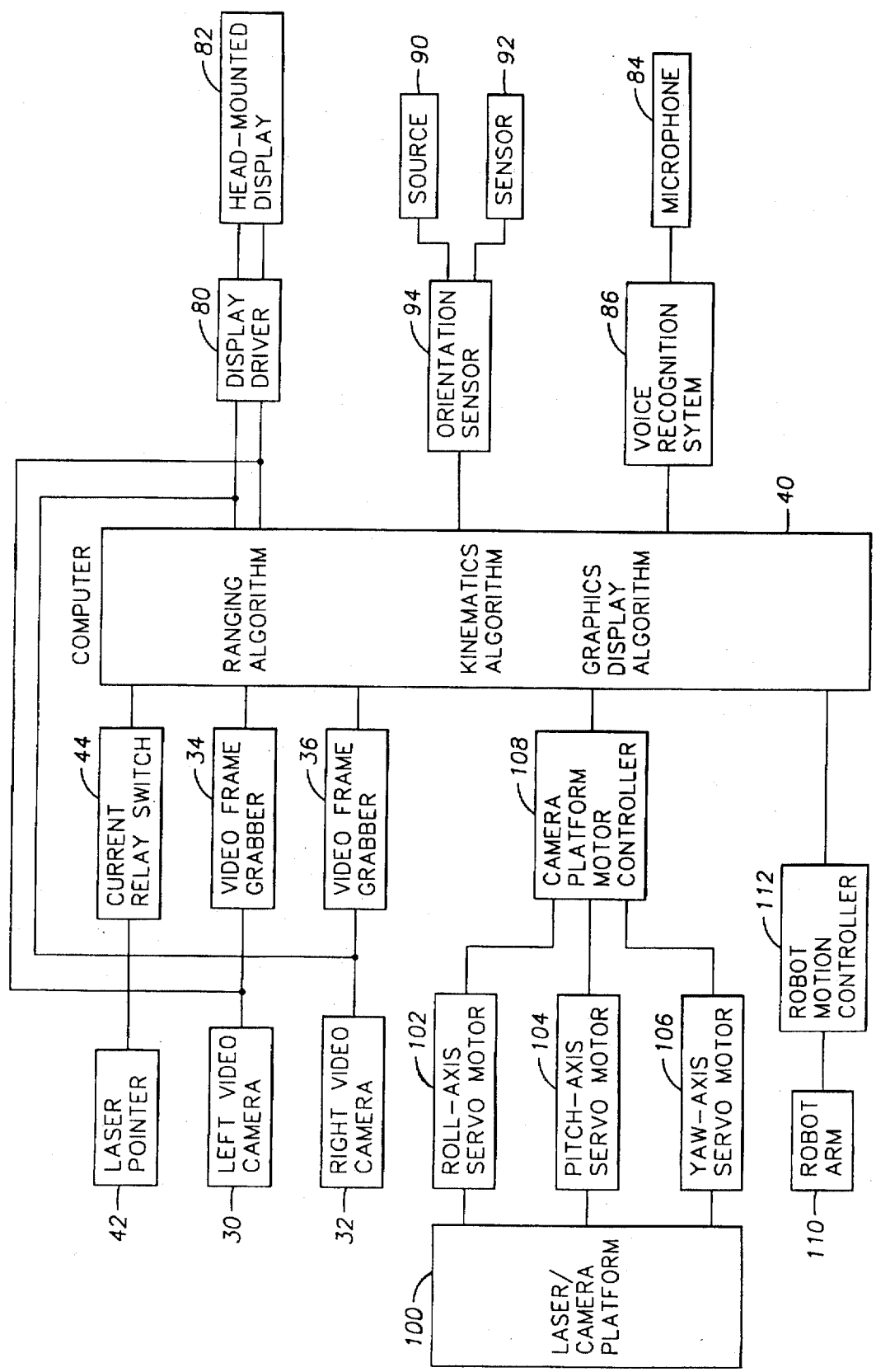
FIG. 3 is a more detailed block diagram showing the components comprising the laser-directed ranging system depicted in FIG. 2 and their interrelationship.

Referring now to FIG. 3, the single camera imaging and ranging system 12 comprises a video camera 30 connected through a conventional video frame grabber board 34 to a computer 40, and a laser pointer 42 connected to the computer 40 through a current relay switch 44. Other directional light sources could be used instead of a laser pointer without departing from the principles of the present invention.

The video camera 30 preferably comprises a high quality color video camera having an image discrimination capability sufficient for the desired application of the ranging system. One suitable camera type is the Model TMC7EX manufactured by PULNIX AMERICA INC. The laser 42 and video camera 30 are mounted so that the laser may illuminate objects within the camera's field of view, as described more particularly below in the section entitled, "Laser/Camera Platform Control System."

The video camera 30 preferably connects to the conventional video frame grabber board 34 which is received in a slot in the chassis of the computer 40. A Datacube MaxVideo 20 frame grabber board, for example, may be used in a telerobotics application. The frame grabber board captures a video image on command, digitizes the image, and stores the digitized image or transmits it on command to the computer 40. The computer 40 may be any microprocessor-based computer capable of executing the control and analysis algorithms described herein, including, for example, a Model No. Sparc 2 workstation manufactured by Sun Microsystems, Inc.

The laser 42 preferably is a low power laser, such as a 1 MW, class II laser diode, which is relatively inexpensive and safe for human operating environments. A ranging algorithm, as described below, executed by the computer 40 sets and resets a digital I/O bit to activate and deactivate the conventional current relay switch 44, which energizes and deenergizes the laser 42, all as is well known to persons having ordinary skill in the art of designing and implementing real time computer control systems.

C. The Ranging Algorithm

The present invention implements a novel ranging algorithm that combines the use of a laser with conventional stereometric ranging theory to provide a ranging system that does not require processing of large numbers of convolution and cross-correlation algorithms. As a result, the ranging algorithm of the present invention can be used in a real-time telerobotics application without a computer having enhanced processing capabilities.

Figure 4:
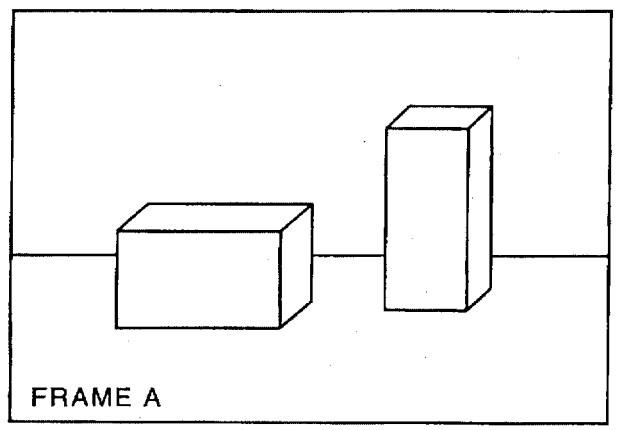
FIG. 4 depicts successive images from the camera shown in FIG. 2 to illustrate the frame subtraction technique of the present invention.
Figure 4:
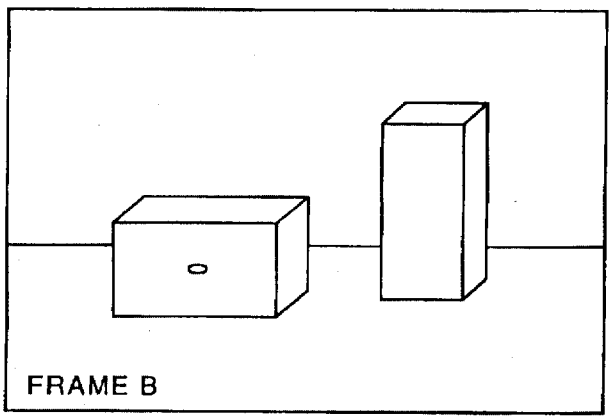
Figure 4:
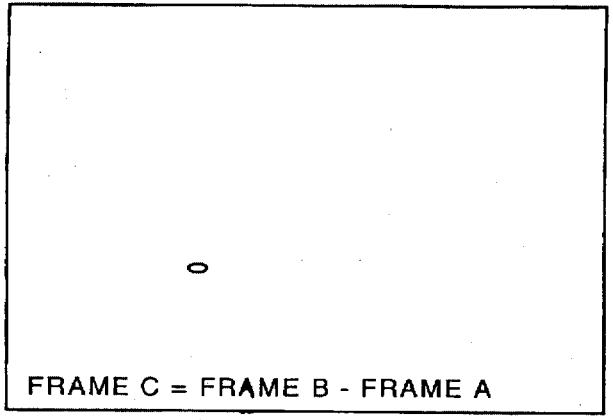

A sequence of video images from the camera 30 as shown in FIG. 4, will aid in understanding Applicants' novel ranging algorithm. Referring now to FIGS. 3 and 4, Frame A shows a representative first image (Frame A) from the camera. Frame B represents a subsequent image of the same scene from the camera 30, with the target box illuminated by the laser 42. Frame A is captured, digitized and stored by the frame grabber board 34. Frame B is then captured, digitized and stored by the frame grabber 34.

The computer 40 then compares Frame A with Frame B and creates a third image (Frame C) in memory in which the common pixels from both frames are eliminated, leaving only the differences between frame A and frame B in the resultant frame. In effect, the image of Frame A is subtracted from the image of Frame B. The disparity between the spot in the third image and a predetermined reference point ($x_r$, $y_r$), lying in the focal plane, can then be calculated. Details of the relationship between the camera, laser and the reference point are described more particularly in the section entitled "Laser Ranging Using Single Camera Alignment And Calibration." The range from the lens, measured along the camera centerline, to the target can be calculated by conventional stereometric ranging analysis based upon the disparity.

Figure 5:
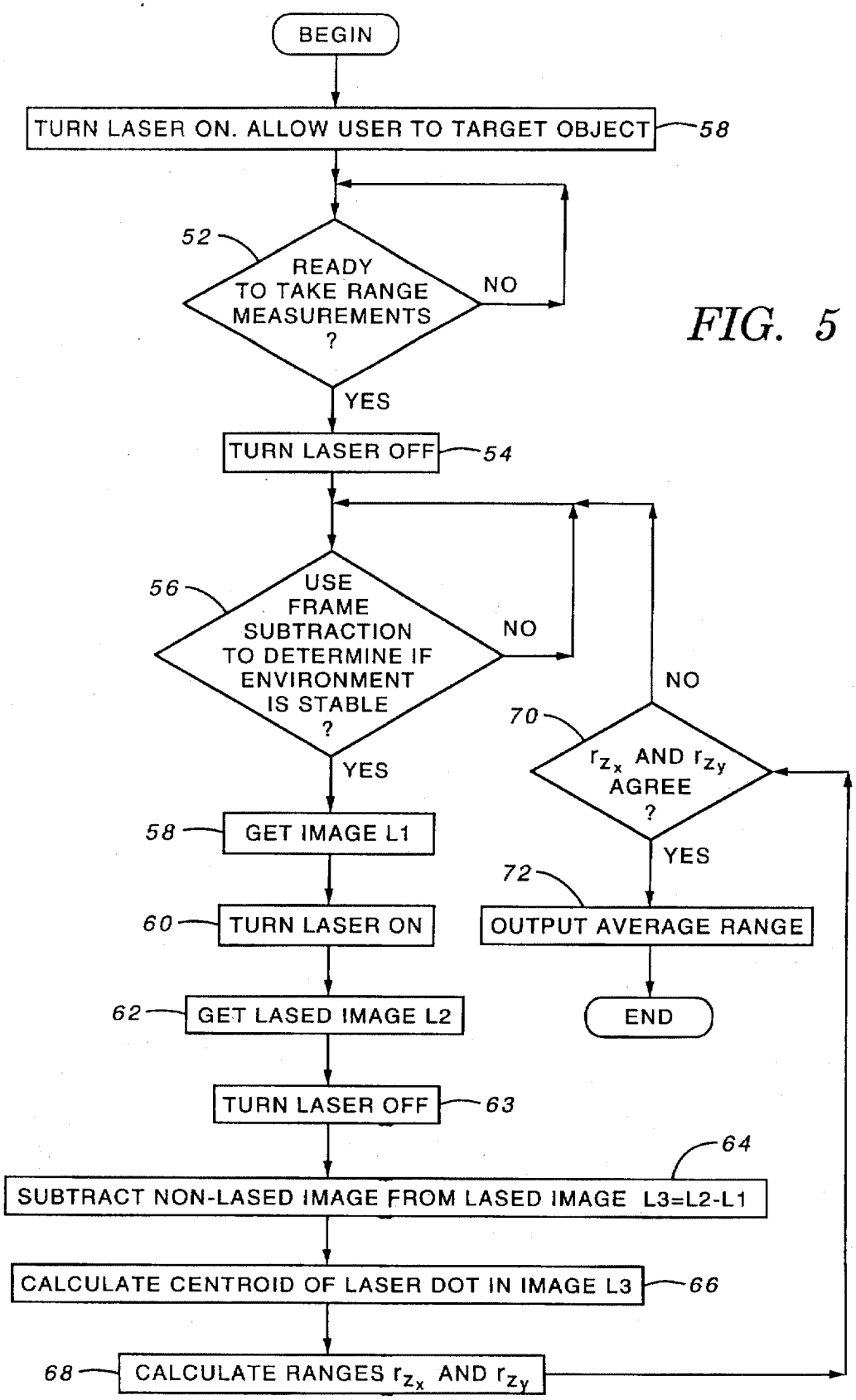
FIG. 5 is a flow chart describing the ranging algorithm executed by the computer shown in FIG. 2.

Referring now to FIG. 5, the ranging algorithm begins operation by activating the laser in step 50. This can be accomplished by a conventional manual switch connected to the computer or by the operator's oral command, which is translated through a voice recognition system forming a part of the computer. Other techniques for activating the laser also can be used without departing from the principles of the present invention.

In step 52, the algorithm waits for an indication from the operator that the operator is ready to take a range measurement. Upon receiving the operator's command to take a range measurement, the algorithm turns off the laser (step 54) and then determines whether the camera is stable enough to execute the ranging measurement (step 56). This can be accomplished, for example, by executing successive frame subtractions until the resulting difference is a blank image for a predetermined length of time.

When the camera is sufficiently steady, the algorithm then executes the frame subtraction routine as described above in connection with FIG. 4. Thus, the frame grabber board captures an image of the target (step 58), the laser is turned on (step 60), the frame grabber board captures an image of the target as illuminated by the laser (step 62), and the laser turns off in step 63. A computer section in the frame grabber or the computer then subtracts the non-illuminated image (I1) from the corresponding illuminated image (I2) to create an image of the laser spot (I3) in step 64.

Next, in step 66, the x and y coordinate of the centroid of the laser spot image preferably is calculated from the following formulae:

$$x = \frac{1}{N} \sum_{n=1}^{N} x_n \qquad (2)$$

$$y = \frac{1}{N} \sum_{n=1}^{N} y_n \qquad (3)$$

where $x_n$ is a binary value of one or zero representing either an illuminated or non-illuminated pixel at the x axis coordinate n of the focal plane. Similarly, $y_n$ values are summed in Equation (3) to yield the y value of the centroid of the laser spot. The pixels selected for these sums may include all pixels of the image or, preferably, a subset of the image which is known to include only the possible illumination positions of the laser dot image. The term "subset of the image" refers to a portion of the image, including fewer pixels that lie on and adjacent to the laser beam image path at the focal plane. The use of the subset for summation reduces software execution time and improves reliability and accuracy of calculation of the laser spot centroid coordinates x and y by eliminating reflections and false signals and by speeding the calculation of equations (2) and (3). A more comprehensive description of the ranging geometry and the use and selection of search zones corresponding to such subsets of the image is provided hereinbelow with reference to FIG. 9.

Figure 6:
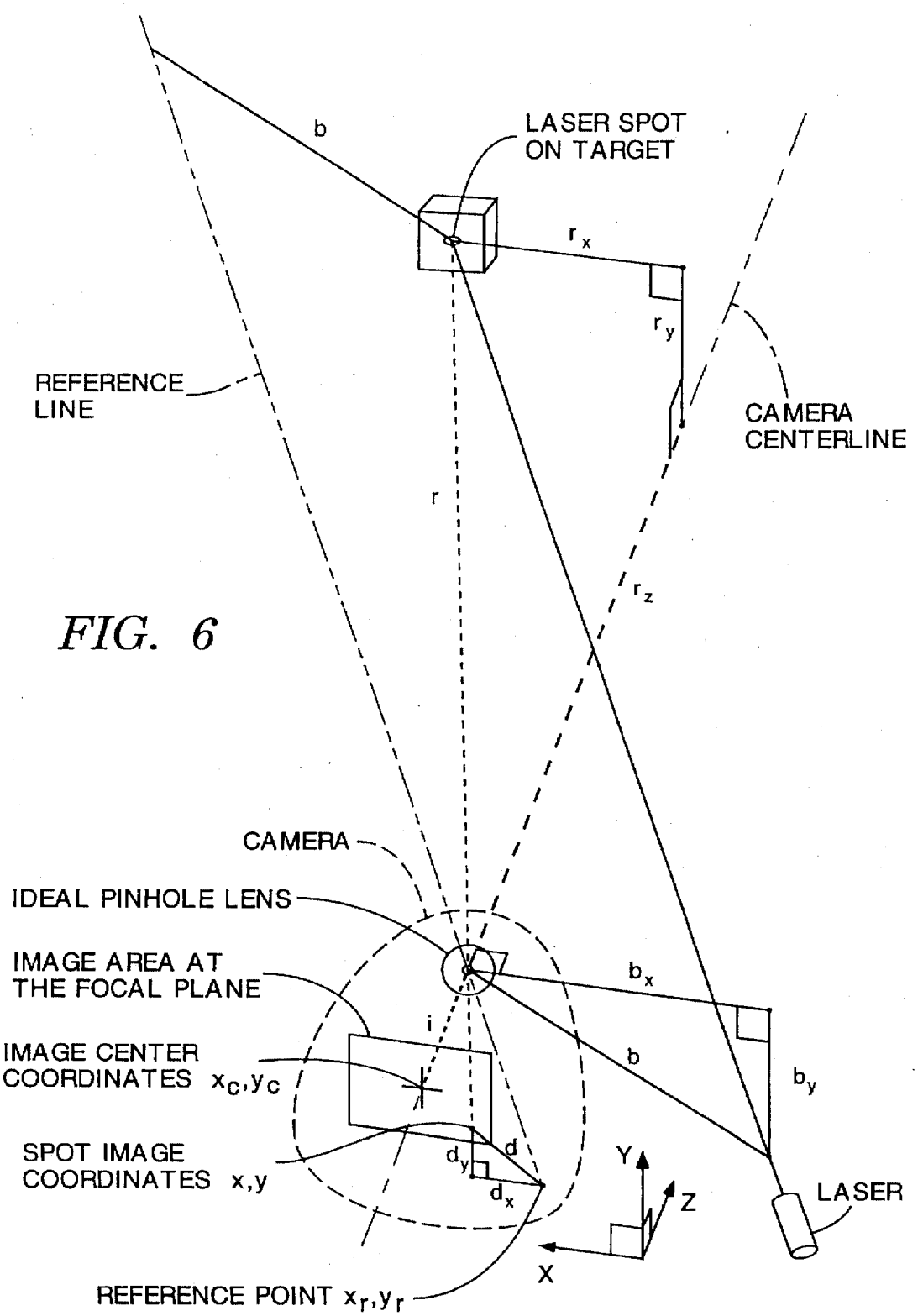
FIG. 6 is a diagram that demonstrates the present technique of ranging using only one camera.

Referring now to FIGS. 5 and 6, the coordinates for the reference point ($x_r$ and $y_r$) are known values, so the horizontal disparity $d_x$, the vertical disparity, $d_y$, and the range estimates $r_{zx}$ and $r_{zy}$ to the target are calculated in step 68.

The horizontal disparity $d_x$, which is measured in pixels, is calculated as $d_x=x-x_r$, where x (derived from Equation (2)) is the horizontal coordinate of the centroid of the laser spot as viewed through the camera, and $x_r$ is the horizontal coordinate of the reference point. The vertical disparity $d_y$, is calculated in the same manner as $d_y=y-y_r$, where y (derived from Equation (3)) is the vertical coordinate of the centroid of the laser spot as viewed through the camera and $y_r$ is the vertical coordinate of the reference point.

The normal range estimates, $r_{z_x}$ and $r_{z_y}$, to the target then can be calculated as follows:

$$r_{z_x} = \frac{ib_x}{d_x} \quad (4)$$

$$r_{z_y} = \frac{ib_y}{d_y} \quad (5)$$

where i is the image distance of the camera, which is the length between the lens secondary principal point and the focal plane measured along the lens centerline; and $b_x$ and $b_y$ are the horizontal and vertical baseline separations respectively of the laser beam and the lens primary principal point, measured perpendicular to the lens centerline. The terms horizontal and vertical are used herein to mean parallel to the horizontal and vertical scan lines, respectively, of the image sensor used. These two range estimates then are compared in step 70 and accepted or rejected based on their relative agreement. If accepted, the two ranges are averaged in step 72 to provide a more accurate estimate of range and this range is output at the completion of the algorithm. If the ranges are rejected, the sequence continues by recycling to a point after step 54 and attempting the range measurement again.

Figure 9:
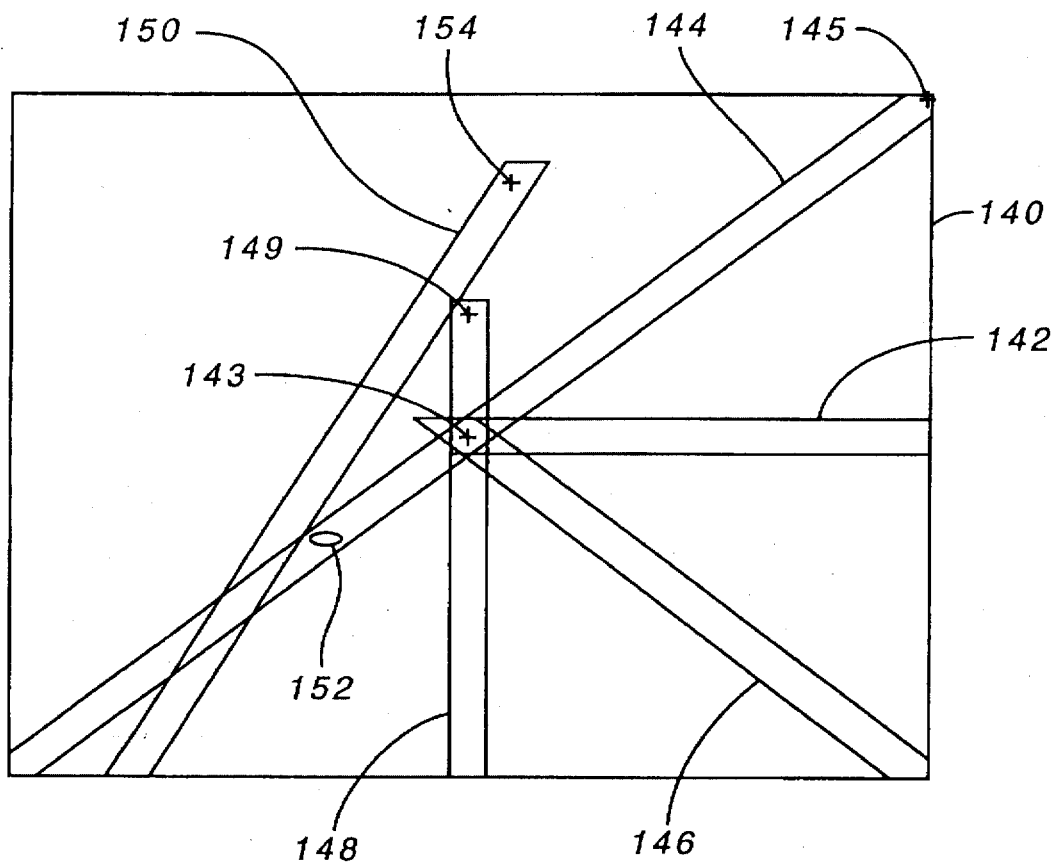
FIG. 9 is a representation of several representative search zones which may be selected for reducing the complexity of the image processing procedure.

Referring additionally to FIG. 9, the range algorithm and processing method, as described hereinabove, may be expedited and greatly simplified by eliminating irrelevant portions of the background within the frame prior to processing for determination of the spot centroid location of the laser spot 150 reflected from the target. In accordance with the method illustrated in FIG. 9, a search zone, such as one of the zones 142, 144, 146, 148, or 150 as shown in FIG. 9, is selected. These search zones are preferably linear portions of the image frame coincident with the axis along which the frame is to be illuminated by the reflected laser spot and in which a portion of the target image is known or predicted to be located. The extraneous areas outside the selected search zone are ignored and not included in the laser spot centroid determination processing steps, since these areas cannot contain direct laser illumination. That is, the image is digitized in processor memory, and only pixels within a selected search zone, extended along a linear axis upon which the laser beam spot reflections from the target may illuminate points at the focal plane, are digitally processed for identifying the location of the laser spot 152 reflected from the target.

Using horizontal raster scanning, the horizontal width of the respective search zone subsets is sufficiently large to encompass all the pixels which may be illuminated by direct reflection from the laser spot illuminating the target 152. Typically, in the case of an ideal pin-hole camera lens or its optical equivalent, the search zone width is preferably approximately equal to or greater than twice the width along a horizontal scan line of the widest portion of the laser spot. In the case of more complex lenses, the search zones may be wider along the horizontal axes, because of optical aberrations which become greater at the outer portions of the optical frame, according to principles known to those in the optical arts. Portions of the image outside the search zones are screened out, in that only the pixels within the selected search zone subset are evaluated, according to equations 2 and 3 hereinabove. Processing of the image is thus limited to the pixels which fall within the search zone. Note that for horizontally or vertically aimed laser orientations, as in search zone 142 or 148 as seen in FIG. 9, only one of equations 2 or 3, as previously set forth, is used. Accordingly, only a single range estimate is possible, since the vertical disparity is zero for a horizontally aimed laser, and horizontal disparity is zero for a vertically aimed laser, making the range in those cases undefined. In those cases, action block 70, shown in FIG. 5, is not performed, and the single range estimate is output as shown in block 72.

The five exemplary search zones illustrated in FIG. 9 provide advantageous search patterns for many applications and will now be individually described, with continued primary reference to FIG. 9.

With respect to the horizontal search zone 142, the laser is aimed horizontally in the same plane as the camera centerline and parallel to that centerline. This limits or constrains the reference point 143 to the center of the image area 140. The reference point of the respective search zone is fixed by the selection of given conditions of camera alignment, laser alignment, and camera lens focal settings. The reference point, defined by a given set of these conditions, represents the image at the focal plane of the laser aim-point at infinity, as described more particularly in the section hereinbelow entitled: "Laser Ranging Using Single Camera Alignment and Calibration."

With respect to search zone 144, the laser is aimed diagonally across the field of view and parallel to two intersecting planes which define horizontal and vertical sides of the field of view. This limits or constrains the reference point 145 to the corner of the image area 140 corresponding to the intersection of these two intersecting planes.

With respect to search zone 146, the laser is aimed parallel to the camera centerline and displaced both horizontally and vertically from the camera centerline or optical axis. This limits or constrains the reference point 143 to the center of the image area 140.

In the search zone shown at 148, the laser is aimed upwardly in a vertical plane parallel to and containing the camera centerline. In this case, the camera axis and laser beam intersect at an angle of less than half the vertical field of view angle. This limits or constrains the reference point 149 to a location within the image area 140, directly above its center.

In search zone 150, the laser is aimed diagonally across the field of view so that the laser passes both vertically and horizontally across the field of view. The angles between the laser beam and the horizontal and vertical planes containing the camera centerline are less than or equal to the respective half angles of the field of view. This limits or constrains the reference point 154 to be within the image area 140. Spot 154 is a reference point ideally corresponding to the illumination of a target at infinity.

In each of the above-described examples, the values of the ranges to be determined extend from that of the range corresponding to the laser beam entry point into the field of view, to infinity. It may be seen that the angle between the laser beam and the camera centerline may be changed, in any of these examples, so as to extend the search zone regions to and beyond the edges of the image area 140, and likewise to move the reference point to the edge and then off the image area 140. This has the effect of increasing the accuracy of the ranging estimate while reducing the upper limit of range measurement, from infinity to a range corresponding to the exit point of the laser beam from the field of view.

D. Head-Mounted Display System

Referring briefly to FIG. 2, the head-mounted display system 14 provides the operator with video feedback of the environment at the remote location. Referring now to FIG. 3, the video signals generated by the camera are channeled to the computer 40, which executes a graphics algorithm to generate an artificial video image. The video image then is transmitted by the computer 40 to a display driver 80, which activates a helmet-like device 82 with one or two display screens that depict the remote scene to the operator. Alternatively, the video image from the camera may be transmitted to the head-mounted display without use of a graphics generated image. In either case, the necessary software and equipment, may be purchased commercially. One such suitable display system is the Flight Helmet manufactured by Virtual Research.

The preferred embodiment of the present invention also includes a microphone 84, which is physically attached to the helmet 82 and coupled through a voice recognition system 86 to the computer 40. The microphone and voice recognition system enable the operator to execute control operations (turn on laser, find range to target, move robot to target, etc.) without using hands or feet. This feature is particularly critical in an application of the invention for the benefit of handicapped persons, as described more particularly below. A commercially available voice recognition system suitable for the present application is the DS400 manufactured by Speech Systems, Inc.

E. Position and Orientation Sensor System

Referring again to FIG. 2, the position and orientation sensor system 16 detects the position and orientation of the operator's head and communicates the information to the computer, which in turn communicates the information to the laser/camera platform control system 18. In this manner, the position and orientation sensor system 16 enables the camera and attached laser at a remote location to mimic movements of the operator's head.

Referring now to FIG. 3, the position and orientation sensor system includes a source 90 for generating a magnetic field in the region of the head-mounted display helmet 82 and a sensor 92 mounted on the helmet 82 for generating electrical signals representative of position and orientation of the helmet within the magnetic field generated by the source 90. The system further includes an interface unit 94 that receives electrical signals from the sensor 92 and generates digital position data (x, y, z) and digital orientation data (roll, pitch, yaw) that is communicated to the computer 40.

The position and orientation sensor system described herein is available commercially. Products suitable for use in this application include the FastTrack manufactured by Polhemus or The Bird manufactured by Ascension Device.

F. Laser/Camera Platform Control System

Referring briefly to FIG. 2, the laser/camera platform control system 18 is a positioning apparatus for moving the camera and the laser relative in response to motion of the operator's head at a remote location. Referring now to FIG. 3, the laser/camera platform control system comprises a platform 100, a roll-axis servo motor 102, a pitch-axis servo motor 104, a yaw-axis servo motor 106, and a motor controller 108.

The platform 100 is a support structure. The camera 30 and the laser diode 42 are affixed to the platform 100 in such a manner that the projected beam of the diode 42 passes through the field of view of the camera 30. The projected beam of the diode 42 will preferably pass across areas of most interest in the camera's field of view at ranges from the camera of most interest to the application. For example, the ranging of objects generally lying in the center of the field of view at ranges of four to six feet will be best accomplished with the projected beam of the diode 42 passing through the center of the field of view at a range of five feet.

The platform 100 preferably has three degrees-of-freedom motion capability, with each degree-of-freedom driven by one of the three servo motors 102, 104, 106. The three motors 102, 104, 106 are controlled by the motor controller 108, which receives orientation position commands from the computer 40. The computer 42 receives data reflecting the position (x, y, z) and orientation (roll, pitch, yaw) of the operator's head, as described above in the section entitled, "Position and Orientation Sensor System," and transforms the position and orientation data into a set of orientation angles (roll, pitch, yaw) that are communicated to the motor controller 108.

The servo motors 102, 104, 106 are preferably stepper motors, such as the type 2842-024C motor manufactured by MicroMo. The motor controller may be, for example, a type LM629 controller manufactured by National Semiconductor, Inc.

G. Laser Ranging Using Single Camera Alignment and Calibration

Referring now to FIG. 6, the present invention preferably calibrates and performs ranging operations with a single camera and laser ranging system. For the purpose of simplifying the following explanation, the present discussion assumes a simple ideal pinhole lens which is available on commercial cameras (for example, see back cover of Edmund Scientific catalogue #14N7, item #J52,569). The use of more complex lenses will introduce corrections which are understood by those skilled in the art of optical systems. Through the geometric relationship between similar triangles, the z component of the range, measured along the camera centerline, from the center of the camera lens to the center of the illuminated spot, may be found as:

$$r_z = \frac{ib}{d} \tag{6}$$

where i is the image distance (distance between the lens secondary principle point and the focal plane, measured perpendicular to the focal plane), b is the baseline distance between the camera lens primary principle point and the laser beam center measured perpendicular to the lens centerline, and d is the disparity or distance between the center of the focused image of the laser spot and a reference point $x_r, y_r$ located in the focal plane.

Referring still to FIG. 6, the reference point $(x_r, y_r)$ represents the coordinates at the focal plane of the center of the laser spot image in the limit as the range, r, approaches infinity. In physical terms, the laser spot would appear to illuminate an object very far away (approaching infinity) at focal plane coordinates $x_r, y_r$. It may be understood that the reference point is a theoretical point and that illumination of an object at infinity is not practical. However for this explanation it is instrumental. It may also be understood that this reference point may lie outside the field of view. That is to say that it may be located in the focal plane at a point off of the image area. This condition may be visualized by the example of a laser directed across the camera's field of view, entering on one side and exiting another. In this case, the laser would illuminate an object at great range out of the field of view.

It may be shown that equation (6) may be applied to the x and y components within the image at the focal plane. That is $$r_{z_x} = \frac{ib_x}{d_x} \tag{7}$$

and $$r_{z_y} = \frac{ib_y}{d_y} \tag{8}$$

This means that with information on the x and y position of an apparent laser spot at the focal plane, two estimates of the z component of range, $r_z$, can be made. These two range values $r_{z_x}$ and $r_{z_y}$ should agree and therefore may be used to improve the accuracy of the range estimate. For example, in a real ranging arrangement, the two range estimates may be averaged, as in block 72 of FIG. 5, in order to partially compensate for discrete errors caused by pixel size of the optical sensor, distortions of the lens, or signal noise. Another example of the use of the two range values to improve the accuracy of the range estimate is to reject samples in which the two range values do not agree within a reasonable band, as in block 70 of FIG. 5. This technique will prove especially useful in an environment where target reflections produce spot images in the field of view that are not in line with the laser beam. These false image spots could then be rejected. Such a "reasonable band" is most effectively proportional to the average of the ranges $r_{z_x}$ and $r_{z_y}$.

Still referring to FIG. 6, a coordinate system x, y, z, whose x and y axes lie in the focal plane will now be considered for purposes of illustration. In order to determine the value of the disparities $d_x$ and $d_y$ in the equations $$d_x = x - x_r \tag{9}$$

and $$d_y = y - y_r \tag{10}$$

it is first necessary to determine the values of the reference point coordinates $x_r$ and $y_r$. This may be accomplished at the point of manufacture or at the point of use. A simplified method is given here assuming that the baseline distances and focal length do not change from the time of calibration to the time of range measurements.

Given that equation 7 is appropriate for all ranges, then it follows that for any two ranges within the field of view, $$r_{z1} = \frac{ib_x}{d_{x1}} \tag{11}$$

and $$r_{z2} = \frac{ib_x}{d_{x2}} \tag{12}$$

Combining these two equations gives:

$$\frac{r_{z1}}{r_{z2}} = \frac{d_{x2}}{d_{x1}} \tag{13}$$

and combining equation 13 with equation 9 and solving for $x_r$ provides:

$$x_r = \frac{x_1 \left(\frac{r_{z1}}{r_{z2}}\right) - x_2}{\left(\frac{r_{z1}}{r_{z2}}\right) - 1} \tag{14}$$

Similarly $y_r$ may be found as:

$$y_r = \frac{y_1 \left(\frac{r_{z1}}{r_{z2}}\right) - y_2}{\left(\frac{r_{z1}}{r_{z2}}\right) - 1} \tag{15}$$

Consequently, the reference point coordinates ($x_r$, $y_r$) may be found in any setup by knowing only the ratio of the ranges of two range measurements and their respective x and y image coordinates at the focal plane in a practical application of this knowledge, the single camera laser range system may be calibrated by simply moving, along the lens centerline, closer to or farther from a target object between reading of the laser spot coordinates. The range ratio, $$\frac{r_{z1}}{r_{z2}} \tag{16}$$

is then set equal to the inverse ratio of the "sizes" of the object before and after the movement, and the respective $x_r$ and $y_r$ may be calculated using equations 14 and 15. "Size" as mentioned above is ideally defined as a fixed dimension between two points on an object that lie in a plane perpendicular to the camera lens centerline. So, in an example application, a system could be equipped with a variable focal length lens (such as a zoom telephoto) and/or a laser with a variable baseline and aim point. Recalibration can be done after changes to these parameters without rulers or prior knowledge of the targets. The only requirements are to be able to identify features on a target and move the camera or target, relative to the other, closer or farther away. Once $x_r$ and $y_r$ are calculated, ranging can be done accurately using the combined equations 7 through 10

$$r_{z_x} = \frac{ib_x}{x - x_r} \tag{17}$$

and $$r_{z_y} = \frac{ib_y}{y - y_r} \tag{18}$$

The z component of the range, $r_z$, may be estimated by either value $r_{z_x}$ or $r_{z_y}$, or as the average of the two. It is also possible to calculate the other two components, $r_x$ and $r_y$ of the target position relative to the camera. These are simply $$r_x = \frac{r_z(x_c - x)}{i} \tag{19}$$

and $$r_y = \frac{r_z(y_c - y)}{i} \tag{20}$$

where $x_c$ and $y_c$ are coordinates of the lens centerline intersection with the focal plane.

The real range r (FIG. 6) therefore is determined by $$x = \sqrt{r_x^2 + r_y^2 + r_z^2} \tag{21}$$

H. Robot Control System

The robot arm preferably comprises the output device of the telerobotic application of the present invention, and thus the robot selected for use in connection with the present invention may vary from one application to the next. Referring now to FIG. 3, the robot control system typically includes a robot arm 110 and a robot motion controller 112, along with a kinematics algorithm executed by the computer 40.

The robot arm 110 includes an end effector, such as a mechanical hand, for accomplishing the purposes of the robot arm. One goal of the present invention is to enable the system 10 to command the end effector on the robot arm to a precise position that corresponds to the position of the target object. The computer defines the Cartesian coordinates of a position command based on information ascertained through the ranging algorithm, as described above. Using the kinematics algorithm, the computer 40 computes the motion controller commands needed to move the end effector on the robot arm 110 to the target position. The commands are communicated by the computer 40 to the motion controller 112, which in turn controls the motors that move the robot arm 110.

One robot arm suitable for telerobotics applications is the type PUMA 560 manipulator manufactured by Staübli.

I. General Operating Procedure of the Preferred Embodiment

Referring still to FIG. 3, a typical operating procedure involves the operator wearing the head-mounted display 82, with the orientation sensor 92 attached above the helmet, and the microphone 84 positioned near the mouth. The source of the sensor system 90 preferably is mounted on a fixture attached to the floor. The sensor on the helmet will measure the orientation of the head relative to the source's reference frame. The orientation sensor system outputs data to the computer 40, preferably via a RS232 serial link. The operator's head orientation is then transformed through the kinematics algorithm of the camera platform 108 to obtain joint commands that will move the laser/camera platform 100 to the same orientation relative to the robot's own reference frame. The joint commands are sent to the laser/camera platform motor controller 108 via a parallel or RS232 port.

To acquire the range information of a visual target selected by the operator, the operator can simply point the laser 42 at the target. The reflected laser "dot" can be seen by the frame grabber 34 as well as the operator. The frame grabber 34 captures the video images and digitizes them. The digital images are stored in memory and, by the frame subtraction technique, the laser "dot" can be isolated in the processed image. This processed digital image is then transmitted to the computer 40. The computer 40 can then find the centroid of the laser "dot" in the image. The computer 40 uses the disparity in the x and y axes between the dot centroid and the predetermined reference point $(x_r, y_r)$ to calculate the range and position (x, y, z coordinates relative to the camera platform) of the target using the ranging algorithm.

Because the orientation of the laser/camera platform 100 relative to the robot arm 110, and the range and position of the target relative to the laser/camera platform are now known, the target's Cartesian position relative to the robot arm 110 can be determined. Once the Cartesian position of the target is known, the robot arm 110 can be commanded to move to that location by voice command via the microphone 84. Once the operator has completed the manipulation of the target object, the laser range finding system can be deactivated by voice command.

J. Alternative Embodiment for Physically Handicapped Persons

Figure 8:
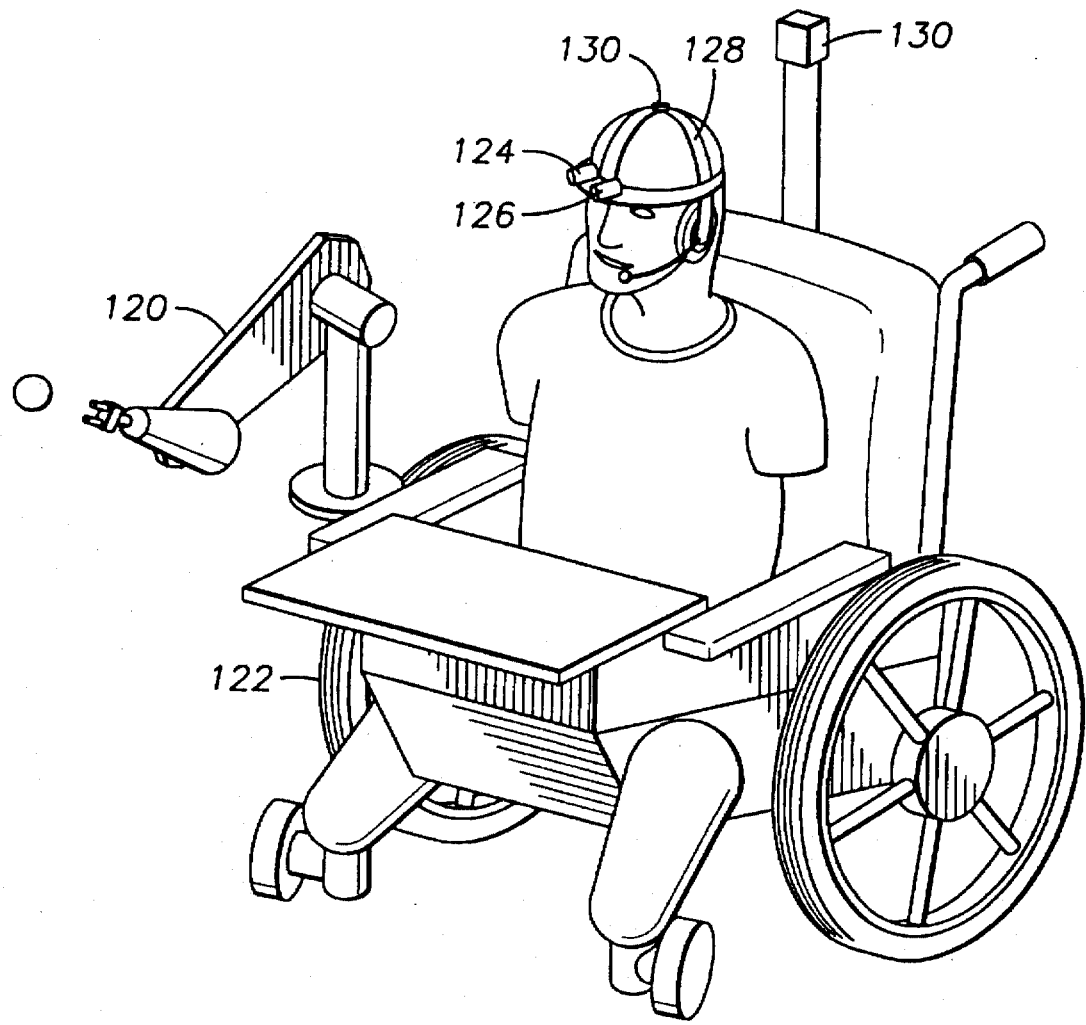
FIG. 8 is a perspective drawing illustrating an application for the present invention involving robotic assistance to handicapped individuals.

The present invention can also be used in applications involving physically handicapped persons. Referring to FIG. 8, a robot arm 120 can be mounted on a wheelchair 122 and the operator can use an alternative embodiment of the invention to tell the robot where the target is so the robot can grasp or manipulate the target object based on the voice commands given by the user.

In the alternative embodiment of the invention referred to in FIG. 8, the camera 124 and laser 126 are mounted on a helmet 128 worn by the operator along with the magnetic direction/position sensors 130. This embodiment eliminates the need for a laser/camera platform control system because the camera and laser will be moved into position locally by the operator's head movements instead of remotely.

The present invention allows the operator to specify the target of interest virtually hands-free. The hands-free method of target selection is more user-friendly to physically handicapped persons than those methods that require some form of manual pointing. Computation is also limited by using the frame subtraction algorithm with the laser illuminated image and the non-laser illuminated image. This limits the size and power necessary to perform the computation, as well as allowing the algorithm to run faster than others on a given processor.

While a preferred embodiment of the invention has been shown and described, modifications thereof can be made by one skilled in the art without departing from the spirit of the invention.

We claim:

1. A ranging system for telerobotics applications, comprising:

a single video camera having a lens;

a directional light source offset from said video camera, said directional light source selectively illuminating a portion of a selected target within the field of view of said video camera, said lens of said single video camera comprising means for forming an image of said illuminated portion of said selected target in the focal plane of said video camera;

a frame grabber for capturing a video frame generated by said video camera and containing said image of said illuminated portion of said selected target;

a robotic device; and a processor electrically coupled to said video camera and said robotic device, said processor including a ranging algorithm for determining the range to said target based upon a comparison between the position of the image of said illuminated target portion formed by said lens of said video camera in the focal plane of said video camera and contained in said video frame, and the position of a reference point located in said focal plane.

2. A system as in claim 1, wherein said light source comprises a laser, and said video camera and said laser are mounted on a camera platform.

3. A system as in claim 2, wherein said camera platform is electrically coupled to said processor, and said processor positions said camera platform based upon electrical signals generated by a position and orientation sensor.

4. A system as in claim 3, wherein said position and orientation sensor generates signals indicative of the movement of an operator's head.

5. A system as in claim 4, wherein the operator is positioned remotely from said video camera.

6. A system as in claim 2, further comprising a voice recognition system coupled to said processor, wherein said laser is activated by a voice command of an operator located remotely from said laser.

7. A system as in claim 6, wherein said laser is activated by a physically handicapped person.

8. A system as in claim 2, wherein said illuminated image includes a spot in said focal plane corresponding to said portion of the selected target.

9. A system as in claim 8, wherein said frame grabber generates a first image of said target with said spot, and said processor determines the disparity in said plane between the spot in said first image and the reference point in said plane.

10. A system as in claim 9, wherein said reference point is the center of said video frame.

11. A system as in claim 9, wherein said reference point is outside the center of said video frame.

12. A system as in claim 9, wherein said reference point is outside said video frame.

13. A system as in claim 5, further comprising a remote display for said operator, said display receiving images from said video camera through said processor.

14. A system as in claim 2, wherein said video camera and said laser are aimed in the same horizontal plane with respect to each other, for determining horizontal disparity.

15. An apparatus for determining range to a target, comprising:
   a directional light source operable to selectively illuminate a portion of a target to selectively create an illuminated spot on said target;
   a video camera for generating an image of said illuminated spot on a video frame; and
   a computer operably associated with said video camera for determining the range to said target by comparing said image of said spot to a reference point located within the plane of said video frame to determine disparity.

16. An apparatus as in claim 15, wherein said light source is offset vertically and horizontally from said video camera.

17. An apparatus as in claim 16, wherein said computer obtains the image of said light source by eliminating common pixels between an image of said target without said illuminated spot and an image of said target with said spot.

18. An apparatus as in claim 17, wherein said computer turns off and on said directional light source.

19. An apparatus as in claim 18, further comprising a platform for directing the directional light source toward said target.

20. An apparatus as in claim 19, wherein said video camera is mounted on said platform, and said platform is positioned by an operator to direct said light source.

21. An apparatus as in claim 20, wherein the platform is positioned in response to the head movement of the operator.

22. An apparatus as in claim 20, wherein said platform is positioned in response to voice commands of operator.

23. An apparatus as in claim 21, further including an operator display receiving images from said video camera.

24. An apparatus as in claim 23, wherein said display is provided in a head-mounted unit.

25. An apparatus as in claim 24, further comprising a robotic device connected to said computer, wherein said operator activates said robotic device and said computer provides an electrical signal indicative of target location to said robotic device.

26. An apparatus as in claim 25, wherein said robotic device is activated by a voice command from the operator.

27. An apparatus as in claim 26, further comprising a voice recognition system connected to said computer, said voice recognition system converting said voice command to an electrical output signal.

28. A method for determining range to a target using a single video camera, comprising the steps of:
   (a) capturing a first image of a target;
   (b) activating a directional light source to form an illuminated spot on a portion of said target;
   (c) capturing a second image of the target while the light source is directed onto the portion of said target;
   (d) generating a third image of the target by eliminating common elements of the first and second set of images; and
   (e) determining range to the target based upon remaining elements in the third image.

29. A method as in claim 28, wherein the range to the target is determined by calculating the disparity between the remaining elements of the third image with a reference point in a video frame of said video camera.

30. A method as in claim 29, wherein said first and said second images are digitized for generating the third image.

31. A method as in claim 28, wherein the step of determining the range to the target includes the step of determining the z component of the range value $r_z$.

32. A method as in claim 31, wherein two $r_z$ values ($r_{zx}$ and $r_{zy}$) are determined.

33. A method as in claim 32, wherein the $r_z$ value is determined by averaging $r_{zx}$ and $r_{zy}$.

34. A method for remotely controlling a robotic device to manipulate a target device, comprising the steps of:
   (a) remotely viewing the target device;
   (b) capturing a video image of said target device;
   (c) activating a laser to generate a spot on said target device;
   (d) capturing a video image of said target device with said spot thereon;
   (e) eliminating common pixels between said video image captured in step (b) and said video image captured in step (d) to obtain a video image of said spot in a focal plane of the video camera;
   (f) determining disparity between said video image obtained in step (e) and a reference point in said focal plane;
   (g) calculating range to said target device based upon said disparity determination;
   (h) positioning said robotic device to contact said target device based upon said range calculation.

35. A method as in claim 34, wherein the step of remotely viewing the target device includes positioning a video camera to view the target device.

36. A method as in claim 35, wherein the positioning of said camera is performed by moving the head of an operator.

37. A method as in claim 34, wherein the video images are captured by a frame grabber circuit.

38. A method as in claim 34, wherein said laser is positioned by an operator and activated by said operator.

39. A method as in claim 34, wherein said laser is activated by a computer after said target device is selected by an operator.

40. A method as in claim 34, wherein the reference point represents the coordinates in the focal plane of the camera for an illuminated spot at infinite range.

41. A method as in claim 34, wherein the disparity includes a horizontal and vertical component.

* * * * *